US010865857B2

(12) United States Patent
Iwagami et al.

(10) Patent No.: US 10,865,857 B2
(45) Date of Patent: Dec. 15, 2020

(54) ACCESSORY DRIVE DEVICE FOR ENGINE

(71) Applicant: MAZDA MOTOR CORPORATION, Hiroshima (JP)

(72) Inventors: Takeyoshi Iwagami, Aki-gun (JP); Masahiro Koizumi, Hiroshima (JP); Shota Kabasawa, Nagaoka (JP); Ikuma Takahashi, Hiroshima (JP); Kenya Ishii, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 358 days.

(21) Appl. No.: 15/760,289

(22) PCT Filed: Mar. 10, 2017

(86) PCT No.: PCT/JP2017/009830
§ 371 (c)(1),
(2) Date: Mar. 15, 2018

(87) PCT Pub. No.: WO2017/159577
PCT Pub. Date: Sep. 21, 2017

(65) Prior Publication Data
US 2018/0266312 A1    Sep. 20, 2018

(30) Foreign Application Priority Data

Mar. 17, 2016    (JP) ................................. 2016-053401

(51) Int. Cl.
*F16H 7/08*    (2006.01)
*F02B 67/06*    (2006.01)

(52) U.S. Cl.
CPC .............. *F16H 7/08* (2013.01); *F02B 67/06* (2013.01); *F16H 7/0829* (2013.01); *F16H 2007/0806* (2013.01); *F16H 2007/0842* (2013.01)

(58) Field of Classification Search
CPC .......... F16H 7/0836; F16H 2007/0814; F16H 2007/0874; F16H 2007/0885
See application file for complete search history.

(56) References Cited

U.S. PATENT DOCUMENTS 2,954,726 A * 10/1960 Kerridge ............... E01C 19/286
                                                              404/117
2,963,918 A * 12/1960 Blakstad ............... F16H 7/0836
                                                              474/111

(Continued)

FOREIGN PATENT DOCUMENTS

DE            3939821 A1    6/1991
DE           19847416 A1    5/1999

(Continued)

OTHER PUBLICATIONS

International Search Report issued in PCT/JP2017/009830; dated May 30, 2017.

*Primary Examiner* — Minh Truong
(74) *Attorney, Agent, or Firm* — Studebaker & Brackett PC

(57) ABSTRACT

An accessory drive system for an engine 1 includes: a drive shaft (a crankshaft 21); a driven shaft (an oil pump drive shaft 31); an endless transmission member (a drive chain 33); a first tensioner disposed on a slack side of the endless transmission member (a first hydraulic tensioner 41); and a second tensioner disposed on a tight side of the endless transmission member (a second hydraulic tensioner 43). The second tensioner has a damping function to damp pushing force applied to the second tensioner by the endless transmission member in a direction opposite to a biasing direction.

4 Claims, 7 Drawing Sheets

(56) References Cited

U.S. PATENT DOCUMENTS

| | | | | |
|---|---|---|---|---|
| 5,159,904 | A | * | 11/1992 | Ingold .................... F01L 1/348 123/90.15 |
| 5,597,367 | A | * | 1/1997 | Trzmiel .................... F01L 1/02 474/110 |
| 5,724,930 | A | * | 3/1998 | Sakurai .................... F01L 1/024 123/90.31 |
| 6,129,644 | A | | 10/2000 | Inoue |
| 6,213,073 | B1 | * | 4/2001 | Iwata .................... F16H 7/0836 123/195 C |
| 6,412,464 | B1 | * | 7/2002 | Schneider ................ F01L 1/02 123/90.15 |
| 6,619,253 | B2 | * | 9/2003 | Kobayashi ................ F01L 1/02 123/195 C |
| 7,033,295 | B2 | * | 4/2006 | Garbagnati ........... F16H 7/0836 474/109 |
| 2008/0173275 | A1 | | 7/2008 | Koyama |
| 2009/0170647 | A1 | * | 7/2009 | Mishima ............... F16H 7/0848 474/110 |
| 2009/0186726 | A1 | | 7/2009 | Van Maanen |
| 2011/0201465 | A1 | | 8/2011 | Kim |
| 2015/0024886 | A1 | * | 1/2015 | Chekansky ........... F16H 7/0836 474/101 |
| 2018/0106346 | A1 | * | 4/2018 | Gonzalez-Mohino .... F16H 7/02 |

FOREIGN PATENT DOCUMENTS

| | | |
|---|---|---|
| DE | 198 49 886 A1 | 5/2000 |
| DE | 20102748 U1 | 12/2001 |
| DE | 102009004859 A1 | 8/2009 |
| JP | H11-118005 A | 4/1999 |
| JP | 2003-206770 A | 7/2003 |
| JP | 2008-175138 A | 7/2008 |
| JP | 2010-084775 A | 4/2010 |
| JP | 2012-246987 A | 12/2012 |
| JP | 2015-098811 A | 5/2015 |

\* cited by examiner

ACCESSORY DRIVE DEVICE FOR ENGINE

TECHNICAL FIELD

The technique disclosed herein relates to an engine accessory drive system.

BACKGROUND ART

Patent Document 1 discloses an engine accessory drive system configured to drive a balance shaft (a driven shaft) by a crankshaft. In this system, a fixed guide is provided at a tight side of the chain looped around the crankshaft and the balance shaft, and a hydraulic tensioner is provided at a slack side of the chain to apply tension to the chain.

Patent Document 2 discloses an engine accessory drive system configured to drive an oil pump drive shaft (a driven shaft) by a crankshaft. In this system, the oil pump drive shaft and a balance shaft which serves as a rotational shaft for driving an auxiliary driven element are coupled by gears engaging with each other.

CITATION LIST

Patent Document

Patent Document 1: Japanese Unexamined Patent Publication No. 2008-175138
Patent Document 2: Japanese Unexamined Patent Publication No. 2015-98811

SUMMARY OF THE INVENTION

Technical Problem

Particularly in systems, such as those disclosed in Patent Document 2, in which a driven shaft and a rotational shaft for driving an auxiliary driven element are coupled by gears, if an instantaneous tension release of the chain occurs at a tight side of the chain between the crankshaft and the driven shaft due to angular velocity changes of the crankshaft, the rotational speed of the gear on the driven shaft becomes slower than the rotational speed of the gear on the rotational shaft for driving the auxiliary driven element. This causes temporary disengagement, and subsequent engagement, between teeth of the gears supposed to be engaged with each other to couple the driven shaft and the rotational shaft for driving the auxiliary driven element. That is, the teeth of the gears repeatedly undergo separation and contact at the gear engagement portion due to angular velocity changes of the crankshaft. High tension is generated when such a gear contact occurs.

Known techniques provide measures against instantaneous tension release of the tight side of the chain between the crankshaft and the driven shaft, in which a tensioner provided at a slack side of the chain is configured to apply greater pushing and biasing force.

However, greater pushing and biasing force of the tensioner on the slack side of the chain increases an average tension of the chain, which leads to an increase in the drive resistance of the chain. As a result, fuel consumption may increase.

In view of the foregoing background, the technique disclosed herein is directed to an engine accessory drive system configured to transmit driving force of a drive shaft to a driven shaft via an endless transmission member, and intended to reduce an average tension of the endless transmission member while substantially preventing tension release of a tight side of the endless transmission member caused by angular velocity changes of the drive shaft.

Solution to the Problem

The technique disclosed herein relates to an engine accessory drive system. An engine accessory drive system includes: a drive shaft; a driven shaft coupled to an engine accessory; an endless transmission member looped around the drive shaft and the driven shaft; a first tensioner disposed on a slack side of the endless transmission member and configured to push and bias the endless transmission member to apply tension to the endless transmission member; and a second tensioner disposed on a tight side of the endless transmission member and configured to push and bias the endless transmission member to apply tension to the endless transmission member.

The second tensioner has a damping function to damp pushing force applied to the second tensioner by the endless transmission member in a direction opposite to a biasing direction.

In this configuration, the slack side of the endless transmission member, looped around the drive shaft and the driven shaft, is provided with the first tensioner which pushes and biases the endless transmission member to apply tension to the endless transmission member, and the tight side, too, is provided with the second tensioner which pushes and biases the endless transmission member to apply tension to the endless transmission member.

The second tensioner has a damping function to damp pushing force applied to the second tensioner by the endless transmission member in a direction opposite to a biasing direction. The damping function allows the second tensioner, when pushed by the endless transmission member in the direction opposite to the biasing direction, to counter the pushing force. In addition, when the endless transmission member nearly has slack, the second tensioner can continue to push the endless transmission member by following the movement of the endless transmission member. As a result, tension release of the tight side of the endless transmission member can be substantially prevented by the second tensioner having a damping function even when angular velocity changes of the drive shaft occur. This configuration allows the first tensioner disposed on the slack side to have smaller pushing and biasing force, compared to the configuration which applies tension to an endless transmission member by only a tensioner disposed on the slack side to prevent tension release of the tight side. Thus, the average tension of the endless transmission member applied by both of the first and second tensioners can be reduced.

In this manner, according to this configuration, the average tension of the endless transmission member can be reduced while preventing tension release of the tight side of the endless transmission member caused by angular velocity changes of the drive shaft.

The first tensioner may have a damping function to damp pushing force applied to the first tensioner by the endless transmission member in a direction opposite to a biasing direction. Each of the first tensioner and the second tensioner may be a hydraulic tensioner having a plunger configured to bias the endless transmission member in the biasing direction by utilizing a hydraulic fluid supplied to a pressure chamber, and a spring which biases the plunger in the biasing direction, and configured to damp the pushing force by utilizing the hydraulic fluid leaked from the pressure chamber when the plunger is pushed by the endless transmission member in the direction opposite to the biasing direction. Biasing force of the first tensioner may be set to be smaller than biasing force of the second tensioner.

Providing the first tensioner having a damping function also on the slack side of the endless transmission member substantially prevents tension release of the slack side of the endless transmission member, as well.

Further, each of the first and second tensioners is a hydraulic tensioner configured to push and bias the endless transmission member by a spring, and push and bias the endless transmission member via a plunger by utilizing the hydraulic fluid supplied. The biasing force of the tensioner disposed on the slack side is set to be smaller than the biasing force of the tensioner disposed on the tight side.

Regarding the tight side of the endless transmission member, not only the tension release caused by the angular velocity changes of the drive shaft, but also the flapping of the endless transmission member caused by the inertial force of the driven shaft need to be reduced. On the other hand, regarding the slack side of the endless transmission member, only the tension release caused by the angular velocity changes of the drive shaft needs to be reduced. Thus, the tension release and the flapping of the endless transmission member on the tight side of the endless transmission member can be reduced effectively by relatively increasing the biasing force applied to the tight side. On the other hand, the tension release on the slack side of the endless transmission member can be reduced effectively even if relatively small biasing force is applied to the slack side. Further, the average tension of the endless transmission member can be reduced by minimizing the biasing force applied to the slack side, which allows for reducing the drive resistance of the endless transmission member.

A spring constant of the spring included in the second tensioner may be set to be greater than a spring constant of the spring included in the first tensioner.

As mentioned earlier, the hydraulic tensioner is configured to push and bias the endless transmission member by the spring, and push and bias the endless transmission member via the plunger, as well, by utilizing the hydraulic fluid supplied to the pressure chamber. To increase the pushing and biasing force applied to the endless transmission member, there are two conceivable measures, that is, increasing the spring constant of the spring, or lowering the leakage speed of the hydraulic fluid from the pressure chamber. However, it is difficult to obtain sufficient pushing and biasing force from the hydraulic fluid if the hydraulic pressure at the start of the engine is low. Thus, in order to achieve stable running of the endless transmission member from the start of the engine, it is preferable to adjust the spring constant so that the endless transmission member is given the stable pushing and biasing force by the spring.

In the above configuration, a spring constant of the spring included in the second tensioner, which is a hydraulic tensioner, is set to be greater than a spring constant of the spring included in the first tensioner, which is also a hydraulic tensioner. In this manner, as described above, the tension release, etc., can be reduced by applying relatively greater pushing and biasing force to the tight side of the endless transmission member. In addition, stable tension can be applied to the endless transmission member even at the start of the engine with a low hydraulic pressure. This configuration achieves stable drive of an accessory driven by a driven shaft from the start of the engine.

Each of the first tensioner and the second tensioner may be configured such that a leakage amount of the hydraulic fluid is variable.

As a result, the damping properties of the first and second tensioners can be changed. For example, the damping properties of the first and second tensioners are changed according to operational state of the engine, thereby making it possible to optimize the pushed state of the endless transmission member.

The slack side and the tight side of the endless transmission member may be arranged adjacent to each other in a direction orthogonal to a direction of a line connecting the drive shaft and the driven shaft in a space between the drive shaft and the driven shaft, and positions where the first tensioner and the second tensioner are opposed to each other and push the slack side and the tight side of the endless transmission member inward may be located closer to the drive shaft or the driven shaft than a middle portion of the line connecting the drive shaft and the driven shaft.

In this configuration, the first and second tensioners are disposed on the slack and tight sides of the endless transmission member which are opposed to each other in a space between the drive shaft and the driven shaft, wherein the first and second tensioners push the slack and tight sides of the endless transmission member inward. Thus, the distance between the slack and tight sides of the endless transmission member is shortest at the positions where the first and second tensioners push the endless transmission member. The distance between the slack and tight sides of the endless transmission member is gradually increased from said positions toward the drive shaft, and also toward the driven shaft.

Here, according to the above configuration, the positions where the first tensioner and the second tensioner are opposed to each other and push the endless transmission member are located closer to the drive shaft or the driven shaft than a middle portion of the line connecting the drive shaft and the driven shaft. Thus, the distance between the tight and slack sides of the endless transmission member is relatively shorter on the side to which the pushing positions are closer (on the side closer to the drive shaft or the driven shaft) and is relatively greater on the opposite side (on the side closer to the driven shaft or the drive shaft). The relatively greater distance between the tight and slack sides provides a space which can be used. For example, a boss for attaching a front cover of the engine may be provided in this space with a greater distance between the tight and slack sides.

Advantages

According to the above-described engine accessory drive system, the second tensioner provided on the tight side of the endless transmission member and having a damping function prevents tension release of the tight side. This configuration therefore allows the first tensioner provided on the slack side to have smaller pushing and biasing force. Consequently, an average tension of the endless transmission member can be reduced while the tension release is prevented.

DESCRIPTION OF EMBODIMENT

Figure 1:
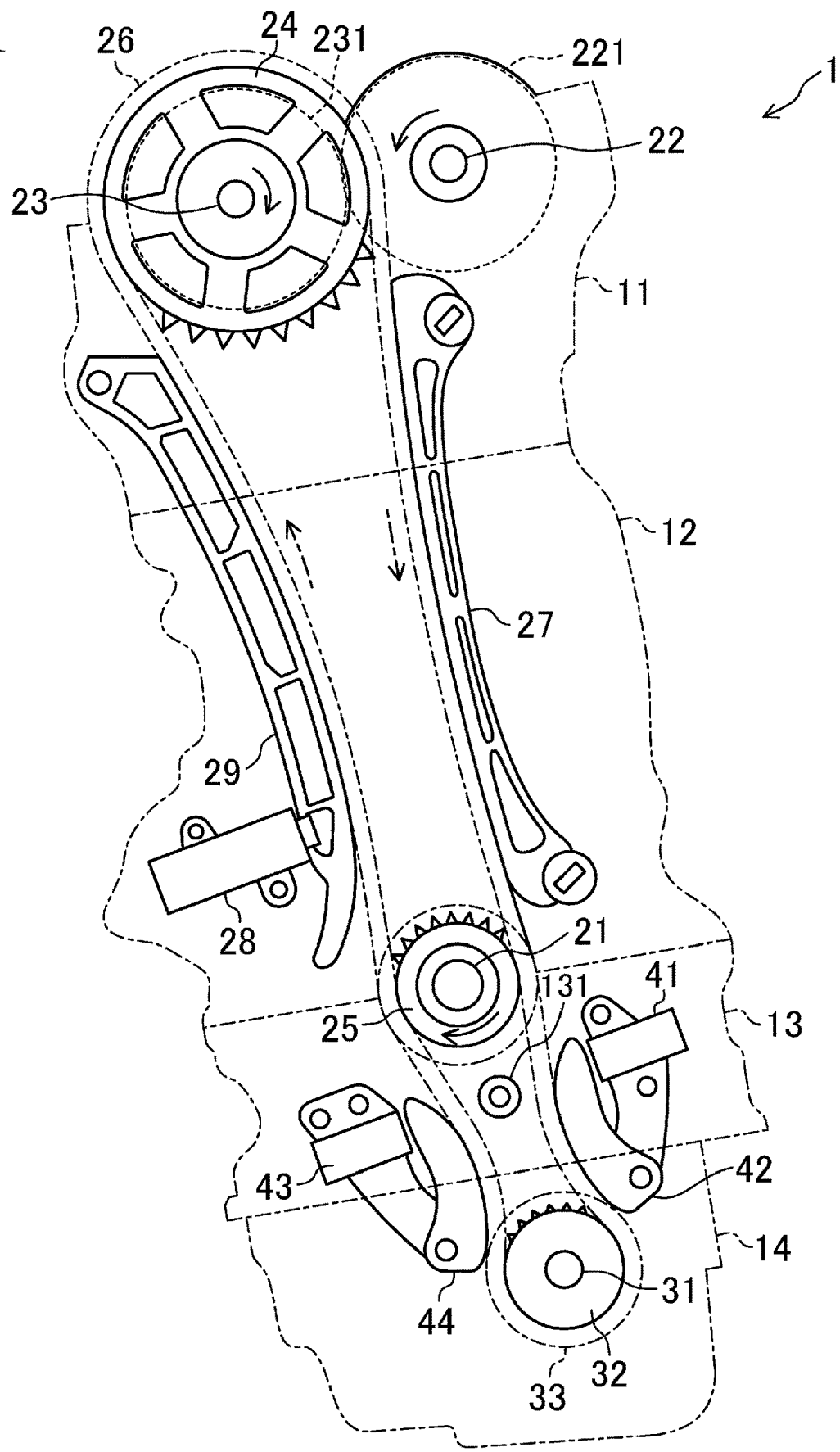
FIG. 1 is a diagram illustrating a front view of an engine to which an engine accessory drive system is applied.

An engine accessory drive system disclosed herein will be described in detail below with reference to the drawings. Note that the following description is merely an example. FIG. 1 illustrates an engine 1 equipped with the accessory drive system. The engine 1 is mounted on an automobile. For example, the engine 1 is an inline-four diesel engine. Note that the engine 1 is not limited to this configuration.

In FIG. 1, the engine 1 is comprised of a head cover (not shown), a cylinder head 11, a cylinder block 12, a lower block 13, and an oil pan 14, from top to bottom of the drawing. The crankshaft 21 is rotatably supported at a portion between the cylinder block 12 and the lower block 13. An intake camshaft 22 and an exhaust camshaft 23 are rotatably supported on the cylinder head 11.

Figure 7:
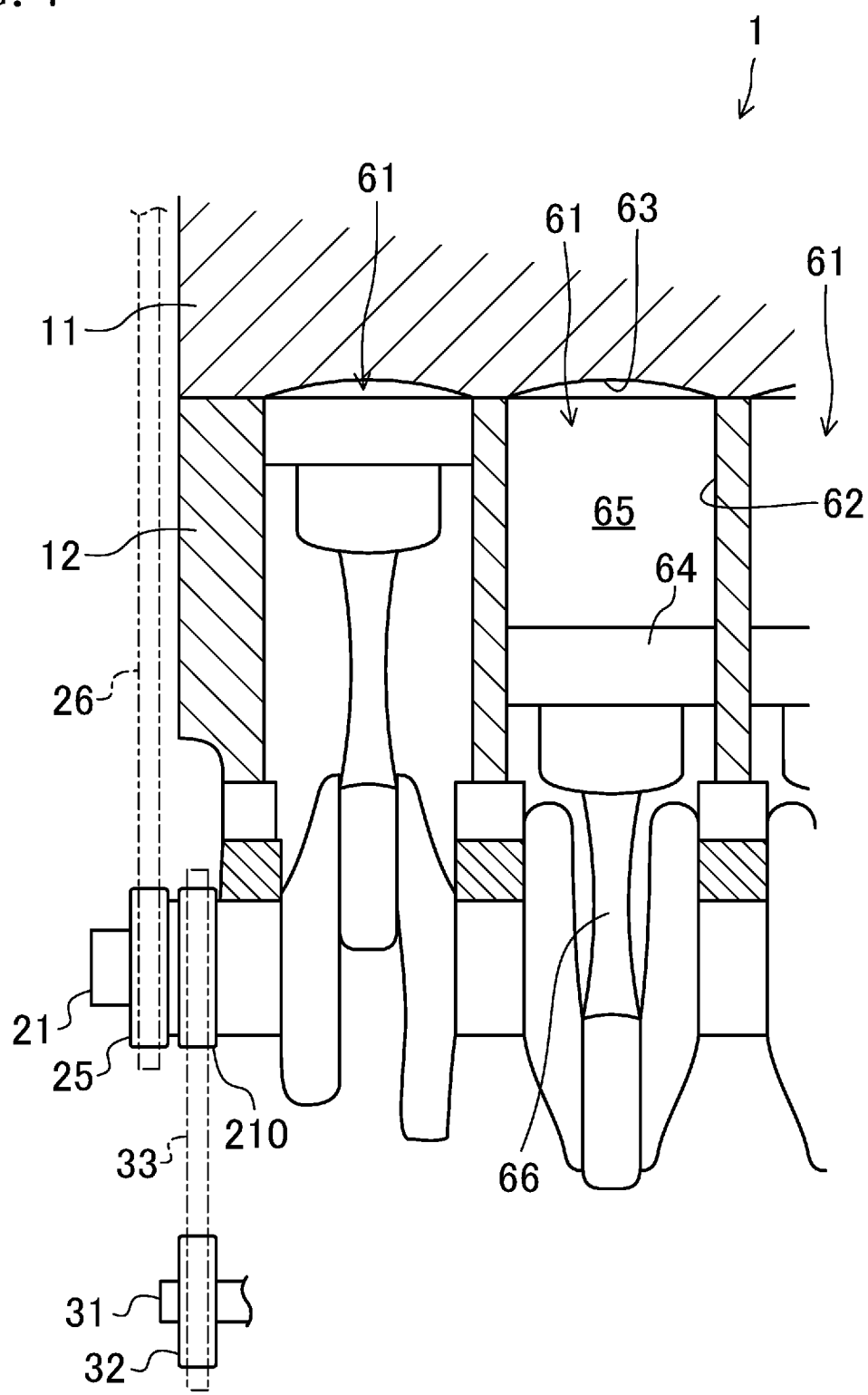
FIG. 7 is a diagram illustrating a cross section of part of the engine internal configuration.

The intake camshaft 22 and the exhaust camshaft 23 are coupled to each other via timing gears 221, 231. A cam sprocket 24 is attached to the exhaust camshaft 23 so as to be coaxial with the exhaust camshaft 23. A crank sprocket 25 is attached to the crankshaft 21. A timing chain 26 is looped around the cam sprocket 24 and the crank sprocket 25. As illustrated in FIG. 7, the engine 1 has a plurality of cylinders 61 in the cylinder block 12. Formed in each of the cylinders 61 is a combustion chamber 65 defined by a cylinder wall (a cylinder liner) 62, a combustion chamber wall 63 formed in the cylinder head 11, and a piston 64. The combustion pressure causes the piston 64 to reciprocate approximately in an axial direction of the cylinder, thereby rotating the crankshaft 21 via a connecting rod 66. The crankshaft 21 serves as a drive shaft. The thus generated driving force is transmitted to the cam sprocket 24 via the crank sprocket 25 and the timing chain 26. As a result, the exhaust camshaft 23 rotates in synchronization with the rotation of the crankshaft 21. The intake camshaft 22, which is coupled to the exhaust camshaft 23 via the timing gears 221, 231, also rotates in synchronization with the rotation of the crankshaft 21 (see the arrows in FIG. 1).

A guide 27 for guiding the timing chain 26 is provided on the tight side of the timing chain 26 (i.e., the right side according to the sheet of FIG. 1). The guide 27 reduces flapping of the timing chain 26. The guide 27 extends vertically along the tight side of the timing chain 26. The guide 27 is fixed to the cylinder head 11 and the cylinder block 12.

A hydraulic tensioner 28 is provided on the slack side of the timing chain 26 (i.e., the left side according to the sheet of FIG. 1). The hydraulic tensioner 28 applies tension to the timing chain 26, and has a damping function. The hydraulic tensioner 28 pushes the timing chain 26 via the tension arm 29. The tension arm 29 extends vertically along the slack side of the timing chain 26. An upper end portion of the tension arm 29 pivots about the cylinder head 11. The hydraulic tensioner 28 is arranged such that the plunger pushes a lower end portion of the tension arm 29 toward the inside of the engine 1. Note that the hydraulic tensioner 28 has the same configuration as a configuration of hydraulic tensioners 41 and 43, described later, which are disposed on the slack and tight sides of the drive chain 33.

Figure 2:
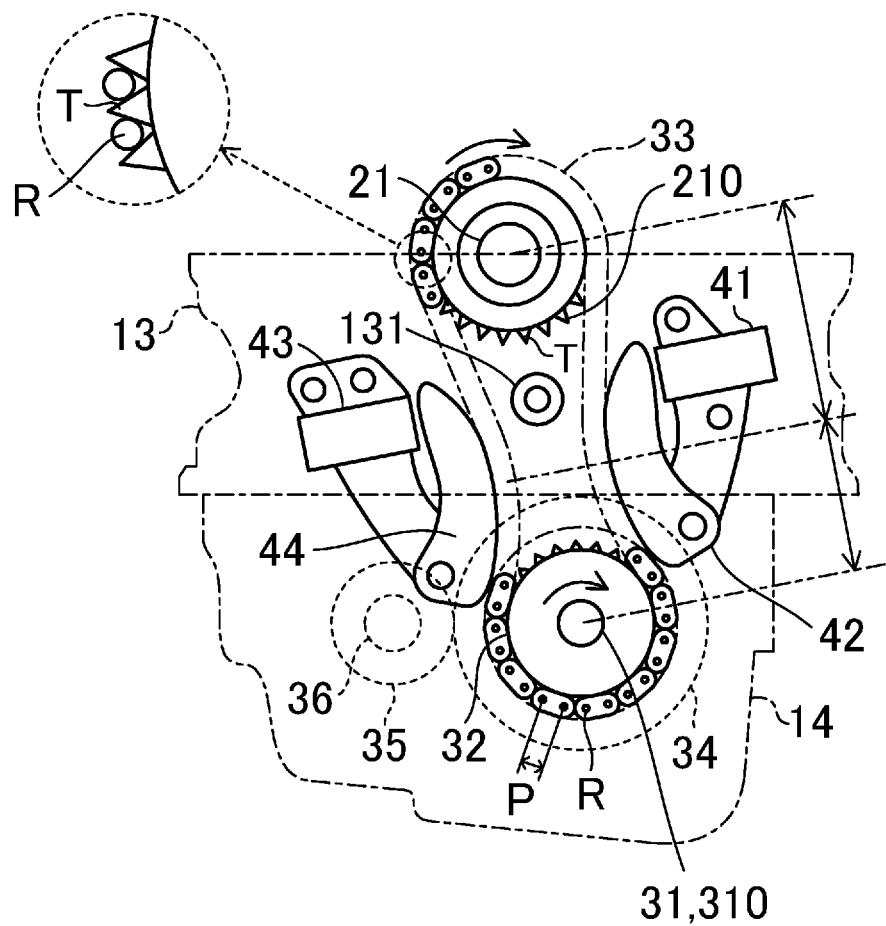
FIG. 2 is a diagram illustrating a configuration of the engine accessory drive system as viewed from the front.

An oil pump drive shaft 31 for driving an oil pump 30 (see FIG. 3) is disposed in the oil pan 14. The crankshaft 21 and the oil pump drive shaft 31 are coupled to each other via a drive chain 33. Specifically, although not shown in FIG. 1, a second crank sprocket 210, which is different from the crank sprocket 25, is attached to the crankshaft 21 so as to be coaxial with the crank sprocket 25, and the drive chain 33 is looped around the second crank sprocket 210 and an oil pump sprocket 32 attached to the oil pump drive shaft 31, as illustrated in FIG. 2. The second crank sprocket 210 and the oil pump sprocket 32 have the same number of teeth. The crankshaft 21 and the oil pump sprocket 32 rotate at the same speed.

Figure 3:
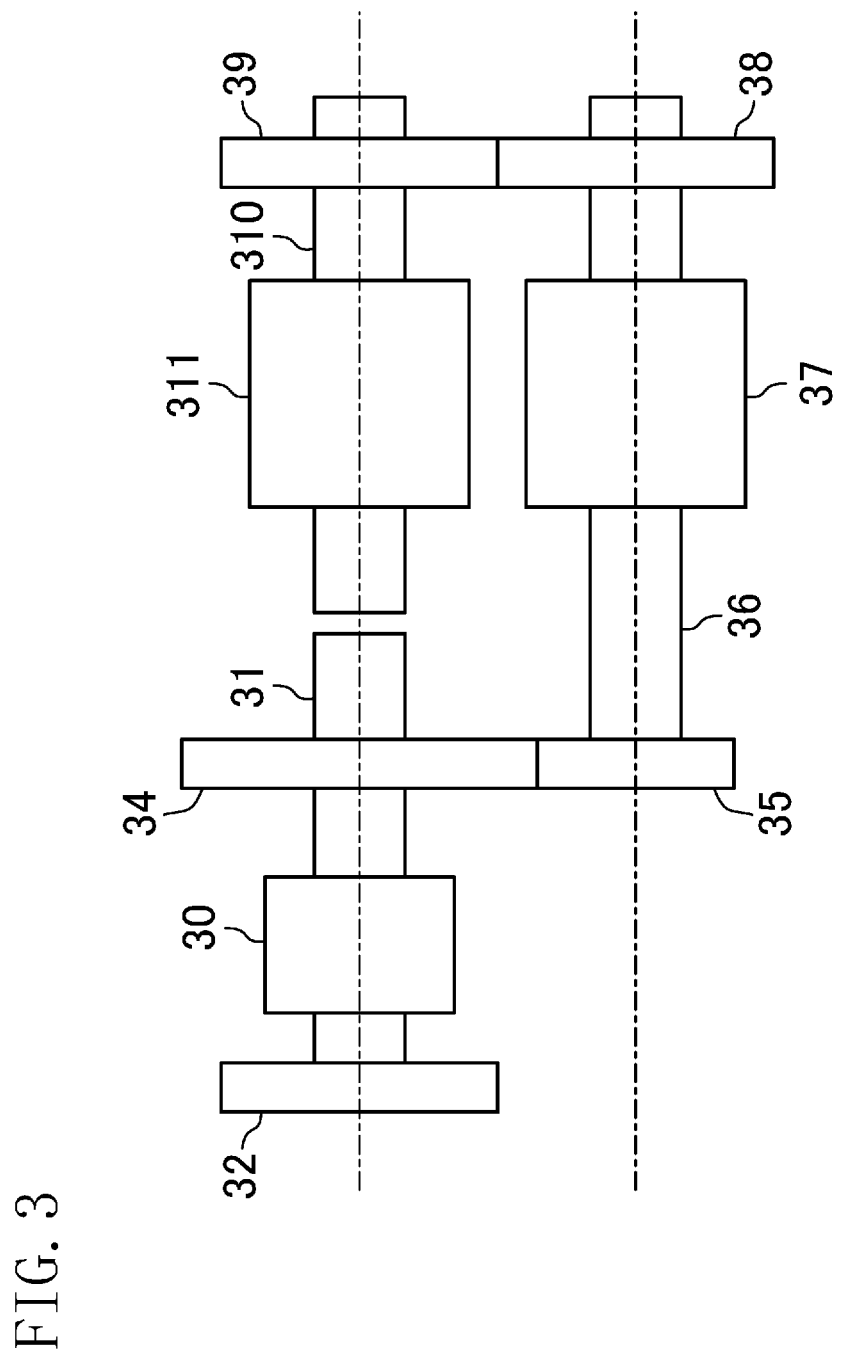
FIG. 3 is a diagram illustrating how an axis of the engine accessory drive system is arranged as viewed from the bottom.

As illustrated in FIGS. 2 and 3, the oil pump drive shaft 31 is provided with a first gear 34 on the opposite side of the oil pump sprocket 32 with respect the oil pump 30. The first gear 34 is configured to mesh with a second gear 35. The second gear 35 is attached to one end portion of a first balance shaft 36 arranged parallel to the oil pump drive shaft 31. As illustrated in FIG. 2, the first balance shaft 36 is arranged horizontally adjacent to the oil pump drive shaft 31. The first gear 34 and the second gear 35 are configured such that the gear ratio between these gears is 2:1. The rotation of the oil pump drive shaft 31 causes the first balance shaft 36 to rotate twice as fast as the rotation of the oil pump drive shaft 31.

A first balance weight 37 is attached to a portion of the first balance shaft 36. A third gear 38 is attached to the other end portion of the first balance shaft 36. The third gear 38 is configured to mesh with a fourth gear 39. The fourth gear 39 is attached to an end portion of a second balance shaft 310, which is arranged parallel to the first balance shaft 36 and coaxial with the oil pump drive shaft 31. The third gear 38 and the fourth gear 39 have the same number of teeth. The first balance shaft 36 and the second balance shaft 310 rotate in opposite directions at constant speed. A second balance weight 311 is attached to a portion of the second balance shaft 310.

In this manner, the accessory drive system for the engine 1 includes the oil pump drive shaft 31, driven by the drive chain 33, to which the first and second balance shafts 36 and 310 are directly or indirectly coupled via the gears 34, 35, 38, and 39. As illustrated in FIG. 2, the drive chain 33 is a well-known endless chain having a plurality of rollers R, . . . , R arranged at a roller pitch P. The plurality of rollers R, . . . , R can mesh with the teeth T, . . . , T formed around the outer periphery of the oil pump sprocket 32. In this configuration, if the angular velocity of the rotation of the crankshaft 21 changes, and an instantaneous drop of the driving force to be transmitted from the crankshaft 21 to the oil pump drive shaft 31 occurs at the time of delay of the angular velocity, the teeth T, . . . , T and the rollers R, . . . , R are disengaged and instantaneous release of the tension occurs on the tight side of the drive chain 33 (i.e., the left side according to the sheet of FIG. 2) between the crankshaft 21 and the oil pump drive shaft 31. Specifically, the rotational speed of the driving gear becomes slower than the rotation speed of the driven gear, which causes temporary disengagement between the teeth of the first and second gears 34 and 35, which couple the oil pump drive shaft 31 and the first balance shaft 36, and the teeth of the third and fourth gears 38 and 39, which couple the first balance shaft 36 and the second balance shaft 310. After that, as the angular velocity of the crankshaft 21 increases, the rollers R, . . . , R of the drive chain 33 and the teeth T, . . . , T of the oil pump sprocket 32 come into contact with each other again, which makes the teeth of the first and second gears 34 and 35 and the teeth of the third and fourth gears 38 and 39 come into contact with each other again. That is, the teeth of the gears repeatedly undergo separation and contact at the gear engagement portion due to velocity changes of the rotation of the crankshaft 21. In addition, high tension may be generated by the impact of such a gear contact.

A timing chain is used as an endless power transmission member in the present example. The same or similar problem may also occur in a system using a belt having a toothed portion on its inner surface and, instead of the sprocket, a pulley having a toothed portion on its outer circumferential surface.

To address this problem, as illustrated in FIGS. 1 and 2, the accessory drive system configured as described above is provided with hydraulic tensioners 41 and 43 having a damping function on both of the tight and slack sides of the drive chain 33 to substantially prevent instantaneous release of the tension of the tight side of the drive chain 33.

Specifically, the hydraulic tensioner 41 on the slack side of the drive chain 33 (i.e., the right side according to the sheets of FIGS. 1 and 2) corresponds to a first tensioner. The first hydraulic tensioner 41 is attached to the lower block 13. The first hydraulic tensioner 41 pushes the drive chain 33 toward the inside of the engine 1 via the tension arm 42. The tension arm 42 extends in a vertical direction of the engine along the slack side of the drive chain 33, with its lower end portion pivoting about the lower block 13. The first hydraulic tensioner 41 is attached to the lower block 13 so as to push an upper end portion of the tension arm 42.

The hydraulic tensioner 43 on the tight side (i.e., the left side according to the sheets of FIGS. 1 and 2) corresponds to a second tensioner. The second hydraulic tensioner 43 is attached to the lower block 13. The second hydraulic tensioner 43 pushes the drive chain 33 toward the inside of the engine 1 via the tension arm 44. The tension arm 44 extends vertically along the tight side of the drive chain 33, with its lower end portion pivoting about the lower block 13. The second hydraulic tensioner 43 is attached to the lower block 13 so as to push an upper end portion of the tension arm 44.

The position where the first hydraulic tensioner 41 pushes the drive chain 33 via the tension arm 42 on the slack side of the drive chain 33 and the position where the second hydraulic tensioner 43 pushes the drive chain 33 via the tension arm 44 on the tight side of the drive chain 33 are substantially aligned in the horizontal direction. These positions where the drive chain 33 is pushed are closer to the oil pump drive shaft 31 than a middle portion, in the vertical direction, of a line connecting the center of the crankshaft 21 (i.e., a drive shaft) and the center of the oil pump drive shaft 31 (i.e., a driven shaft) is.

The distance between the tight and slack sides of the drive chain 33 is shortest at the positions where the first and second hydraulic tensioners 41 and 43 push the chain. From this shortest distance position, the distance increases towards the crank sprocket 25 and towards the oil pump sprocket 32. Since the positions where the first and second hydraulic tensioners 41 and 43 push the chain are closer to the oil pump drive shaft 31, the distance between the tight and slack sides of the drive chain 33 is relatively wider near the crankshaft 21. Thus, a comparatively wide open space can be created near the crank sprocket 25 in an area defined by the crank sprocket 25, the oil pump sprocket 32, and the tight and slack sides of the drive chain 33. Since this open space is located near the middle portion, in the lateral direction, of the engine 1, a boss 131 for attaching a front cover (not shown) of the engine 1 is provided in this open space in the shown example. The front cover can thus be firmly attached, thereby making it possible to reduce the noise caused by the vibrations of the front cover.

Figure 4:
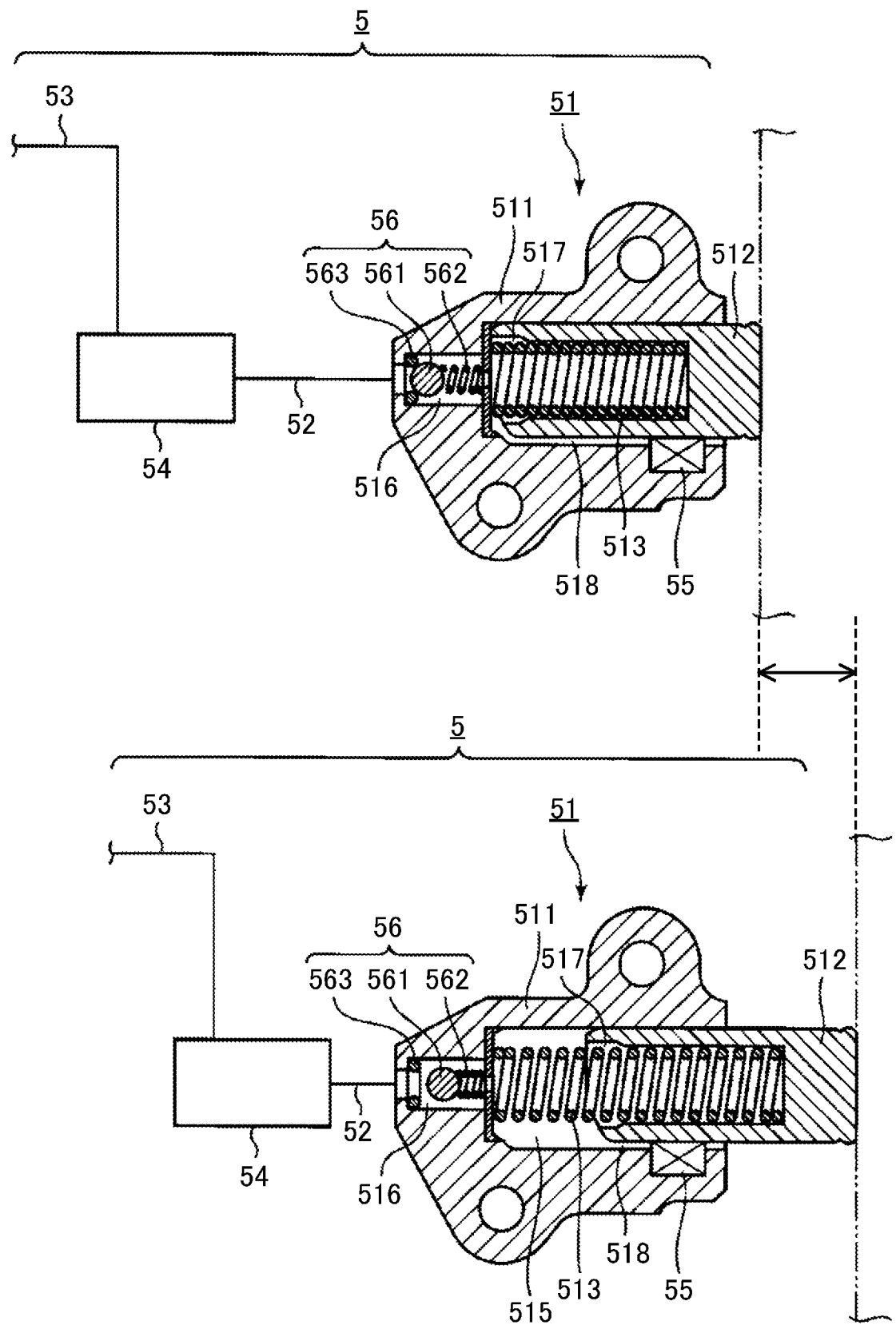
FIG. 4 is a diagram illustrating a cross section of a configuration of a hydraulic tensioner. The upper diagram illustrates a state where a plunger retracts. The lower diagram illustrates a state where the plunger proceeds.

FIG. 4 illustrates a configuration of a hydraulic tensioner 5. The hydraulic tensioner 5 illustrated in FIG. 4 is employed as the hydraulic tensioner 28, described earlier, which is provided on the slack side of the timing chain 26, and the first and second hydraulic tensioners 41 and 43 provided on the slack and tight sides of the drive chain 33. For convenience of description, the right side of the sheet of FIG. 4 is called the "front" side and the left side of the same sheet is called the "rear" side. The upper diagram of FIG. 4 illustrates a state where a plunger 512 retracts. The lower diagram illustrates a state where the plunger 512 proceeds.

The hydraulic tensioner 5 is comprised of a tensioner body 51, an external channel 52, an external induction channel 53, and a hydraulic fluid tank 54.

The tensioner body 51 has a casing 511, a plunger 512, a compression coil spring 513, and a check valve 56. The casing 511 has a pressure chamber 515 and an internal flow channel 516.

The pressure chamber 515 is a cylindrical chamber which extends in the front and rear direction and into which a hydraulic fluid is introduced. The front end of the pressure chamber 515 is open.

The internal flow channel 516 is a single flow channel that has the function of introducing the hydraulic fluid into the pressure chamber 515 and the function of drawing the hydraulic fluid from the pressure chamber 515. A front end portion of the internal flow channel 516 is connected to a rear end portion of the pressure chamber 515. A rear end portion of the internal flow channel 516 is open on the outer surface of the casing.

The plunger 512 is inserted and fitted in the pressure chamber 515. A front end portion of the plunger 512 protrudes from a front end portion of the pressure chamber 515. The plunger 512 can reciprocate along the axial direction of the pressure chamber 515, while sliding along the inner circumferential surface of the pressure chamber 515.

The plunger 512 includes a cylindrical spring holding chamber 517 which extends in the front and rear direction. The rear end portion of the spring holding chamber 517 is open.

The compression coil spring 513 is held in the spring holding chamber 517. A front end portion of the compression coil spring 513 is in contact with the inner wall surface of a front end portion of the spring holding chamber 517. A rear end portion of the compression coil spring 513 is in contact with the inner circumferential surface of a rear end portion of the pressure chamber 515.

The external flow channel 52 is provided outside the casing 511. A front end portion of the external flow channel 52 is connected to a rear end portion of the internal flow channel 516. The external flow channel 52 is a single flow channel that has the function of introducing the hydraulic fluid into the internal flow channel 516 and the function of drawing the hydraulic fluid from the internal flow channel 516.

A downstream end portion of the external introduction channel 53 and a rear end portion of the external flow channel 52 are connected to the hydraulic fluid tank 54. The hydraulic fluid tank 54 can accumulate the hydraulic fluid introduced from the external introduction channel 53. The hydraulic fluid accumulated in the hydraulic fluid tank 54 is supplied to the pressure chamber 515 through the external flow channel 52 and internal flow channel 516.

The external introduction channel 53 is provided outside the casing 511. The upstream end of the external introduction channel 53 is connected to the oil pump 30 via a main gallery not shown.

A groove 518 extending in the front and rear direction is formed in the inner circumferential surface of the pressure chamber 515. A gap for leaking the hydraulic fluid out of the pressure chamber 515 is formed between an inner circumferential surface of the groove 518 and an outer circumferential surface of the plunger 512.

The casing 511 is provided, inside thereof, with a flow rate control valve 55 which adjusts a flow rate of the hydraulic fluid leaking from this gap. The flow rate control valve 55 is of a linear movement type, having a stem (not shown) and a valve body (not shown) provided at a tip portion of the stem. The valve body changes the cross-sectional area of the flow channel in the groove 518 by making a linear movement in the groove 518 in a direction orthogonal to the extending direction of the groove 518. The flow rate control valve 55 is controlled by an engine controller not shown.

The internal flow channel 516 is provided, inside thereof, with a check valve 56. The check valve 56 includes: an O-ring 563 provided at an rear end portion in the internal flow channel 516; a compression coil spring 562 disposed in the internal flow channel 516 along the axial direction of the channel 516, with its front end portion positioned at a front end portion in the channel 516; and a ball 561 fixed to a rear end portion of the compression coil spring 562. The check valve 56 is open only in a direction along which the hydraulic fluid flows into the pressure chamber 515.

The hydraulic tensioner 5 having the above structure pushes and biases the chain via the plunger 512 by utilizing the biasing force of the compression coil spring 513 and the hydraulic pressure of the hydraulic fluid supplied to the pressure chamber 515. When the hydraulic tensioner 5 is pushed by the chain in a direction opposite to a biasing direction, the compression coil spring 513 is compressed by the plunger 512, thereby generating reaction force of the compression coil spring 513, as well as generating damping force as a result of drawing the hydraulic fluid from the pressure chamber 515 through the groove 518. In this manner, the hydraulic tensioner 5 has a damping function.

Figure 5:
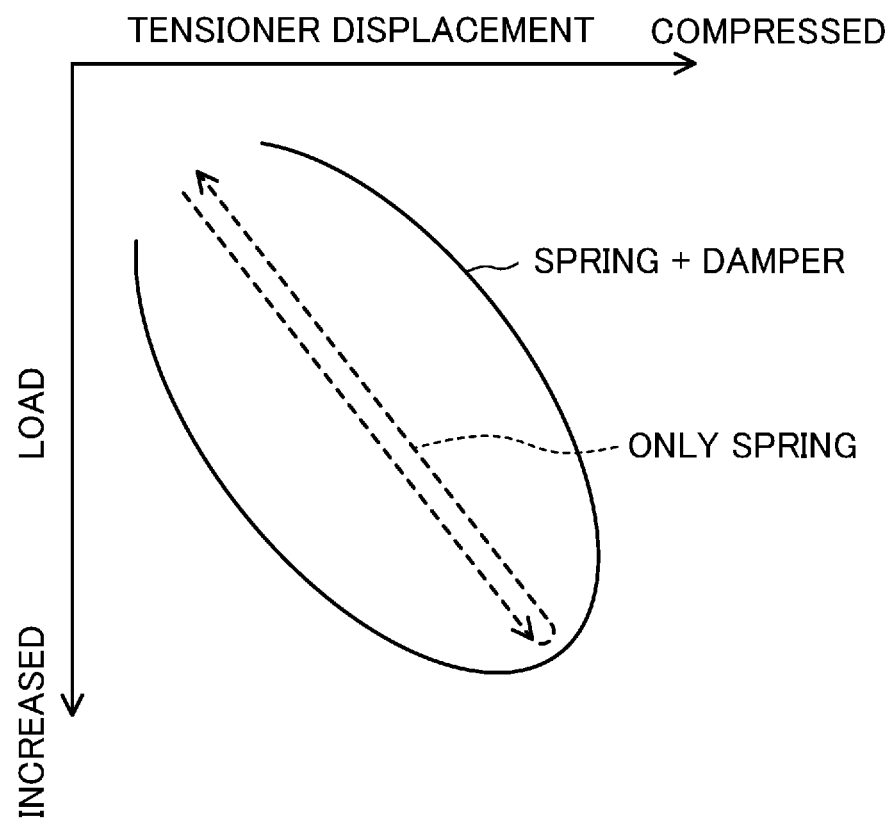
FIG. 5 shows a comparison about properties between a tensioner having only a spring and a tensioner having a spring and a damper.

FIG. 5 shows a comparison of property differences between a tensioner having only a spring and a tensioner having a spring and a damper (i.e., the hydraulic tensioner 5). The tensioner having only a spring exhibits a linear relationship between the displacement of the tensioner and a load applied to the chain by the tensioner, because only a reaction force is generated in reaction to the displacement of the tensioner, that is, deformation of the spring. On the other hand, the tensioner having a spring and a damper exhibits a nonlinear relationship between the displacement of the tensioner and a load applied to the chain by the tensioner, because such a tensioner has a damping function. The tensioner having a spring and a damper sufficiently receives a load applied by the chain when the tensioner is pushed and displaced by the chain. Therefore such a tensioner is less likely to be displaced. In addition, when the chain nearly has slack, the tensioner having a spring and a damper can continue to apply tension to the chain by following the displacement of the chain.

Thus, the provision of the second hydraulic tensioner 43 on the tight side of the drive chain 33 allows the plunger of the hydraulic tensioner 43 to follow the displacement of the tight side of the drive chain 33 when the angular velocity changes of the crankshaft 21 occurs and nearly causes a tension release of the drive chain 33. As a result, an instantaneous tension release on the tight side of the drive chain 33 can be effectively prevented.

Since the instantaneous tension release on the tight side of the drive chain 33 can be effectively prevented by the second hydraulic tensioner 43 provided on the tight side of the drive chain 33, it is not necessary that the first hydraulic tensioner 41 provided on the slack side of the drive chain 33 have much greater pushing and biasing force. That is, smaller pushing and biasing force applied by the first hydraulic tensioner 41 provided on the slack side of the drive chain 33 can reduce an average tension of the drive chain 33. Consequently, in the engine 1 configured as described above, the drive resistance of the drive chain 33 can be reduced, and the fuel efficiency can be improved.

Figure 6:
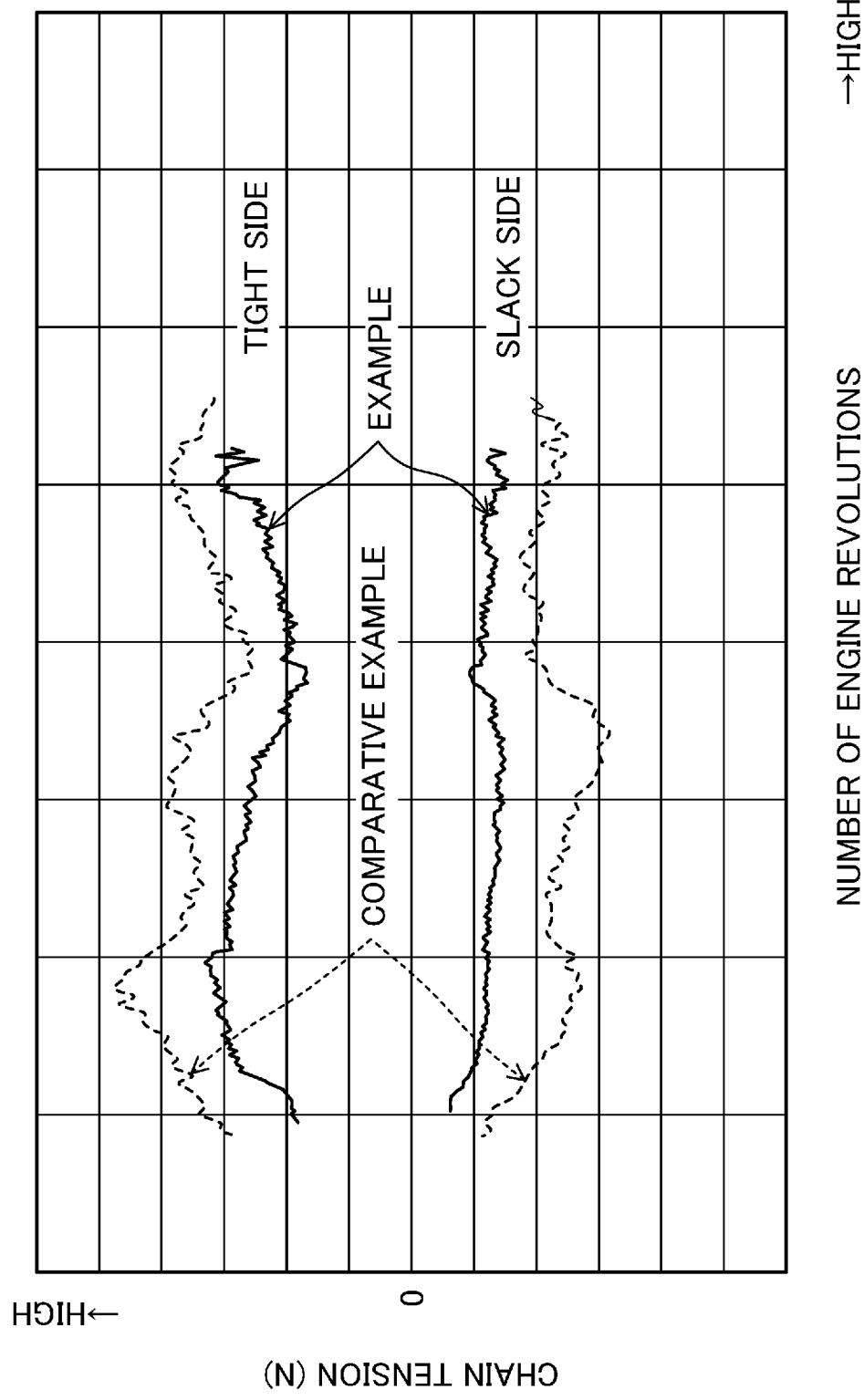
FIG. 6 shows a comparison about an average chain tension between an Example and a Comparative Example.

FIG. 6 shows a comparison about an average chain tension between an example configuration (i.e., Example indicated by solid lines) in which hydraulic tensioners are provided on both of the tight and slack sides of the drive chain 33, and an example configuration (i.e., Comparative Example indicated by broken lines) in which a hydraulic tensioner is provided on only the slack side of the drive chain 33 and a fixed guide for guiding the drive chain 33 is provided on the tight side of the drive chain 33. In FIG. 6, the lateral axis represents the number of engine revolutions, and the vertical axis represents the tension of the drive chain 33. Positive values on the vertical axis correspond to the tight side of the drive chain 33. Negative values on the vertical axis correspond to the slack side of the drive chain 33. FIG. 6 reveals that the average tension of the drive chain 33 of the Example is lower than that of the Comparative Example at any number of engine revolutions.

Herein, the pushing and biasing force of the first hydraulic tensioner 41 provided on the slack side is set to be smaller than the pushing and biasing force of the second hydraulic tensioner 43 provided on the tight side.

Regarding the tight side of the drive chain 33, not only the tension release caused by the angular velocity changes of the crankshaft 21, but also the flapping of the drive chain 33 caused by the inertial force of the oil pump drive shaft 31 and the first or second balance shaft 36, 310 need to be reduced. On the other hand, regarding the slack side of the drive chain 33, only the tension release caused by the angular velocity changes of the crankshaft 21 needs to be reduced. Thus, the tension release and the flapping of the endless transmission member on the tight side of the drive chain 33 can be reduced effectively by a relative increase in the biasing force applied to the tight side. On the other hand, the tension release on the slack side of the drive chain 33 can be reduced effectively by a relative reduction in the biasing force applied to the slack side. In addition, the average tension of the drive chain 33 can be reduced by minimizing the biasing force applied to the slack side. Consequently, the drive resistance of the drive chain 33 is reduced, and the fuel efficiency is improved.

The spring constant of the compression coil spring included in the second hydraulic tensioner 43 is greater than the spring constant of the compression coil spring included in the first hydraulic tensioner 41.

As mentioned earlier, the hydraulic tensioner 5 is configured to push and bias the chain by the compression coil spring 513, and also push and bias the chain via the plunger 512 by utilizing the hydraulic fluid supplied to the pressure chamber 515. To increase the pushing and biasing force applied to the chain, there are two conceivable measures, that is, increasing the spring constant of the compression coil spring 513, or lowering the leakage speed of the hydraulic fluid from the pressure chamber 515. However, sufficient pushing and biasing force cannot be obtained from the hydraulic fluid if the hydraulic pressure at the start of the engine 1 is low. Thus, in order to achieve the stable running of the chain from the start of the engine 1, it is preferable to adjust the spring constant so that the chain is given the stable pushing and biasing force by the compression coil spring 513.

Therefore in the above configuration, the spring constant of the compression coil spring included in the second hydraulic tensioner 43 is set to be greater than the spring constant of the compression coil spring included in the first hydraulic tensioner 41, thereby making it possible to give stable tension to the chain even at the start of the engine 1 with a low hydraulic pressure. This configuration achieves stable drive of the oil pump 30 and the first and second balance shafts 36 and 310 from the start of the engine 1.

In the configuration described above, each of the first hydraulic tensioner 41 provided on the slack side of the drive chain 33 and the second hydraulic tensioner 43 provided on the tight side of the drive chain 33 has variable damping properties. For example, when the rotational speed of the engine 1 is low, the leakage amount of the hydraulic fluid is reduced to increase the tension of the drive chain 33. Consequently, flapping of the drive chain 33 can be effectively reduced. When the rotational speed of the engine 1 is low, requirements regarding evaluation criteria for noise, vibration, and harshness (NVH) are stricter, that is, more comfort is required. In such a case, the flapping of the drive chain 33 is reduced by increasing the tension of the drive chain 33, thereby making it possible to reduce noise caused by running of the drive chain 33. On the other hand, when the rotational speed of the engine 1 is high, the leakage amount of the hydraulic fluid is increased to reduce the tension of the drive chain 33. As a result, the drive resistance of the drive chain 33 is reduced, and the fuel efficiency is improved. When the rotational speed of the engine 1 is high, the requirements regarding NVH are relatively moderate. Therefore, a degree of reduction of the noise caused by the drive chain 33 can be reduced relatively. Thus, the disadvantage is slight which may occur when the tension of the drive chain 33 is reduced.

Note that in the engine accessory drive system disclosed herein, the hydraulic tensioner with variable damping properties is a non-limiting example, and a hydraulic tensioner with constant damping properties may also be employed as the hydraulic tensioner provided at the slack side and/or the tight side of the drive chain 33.

Further, in the above configuration, hydraulic tensioners having a damping function are provided on both of the slack and tight sides of the drive chain 33, but a hydraulic tensioner having a damping function may be provided on only the tight side of the drive chain 33. In such a case, a tensioner not having a damping function, but having only a spring, may be provided on the slack side of the drive chain.

Note that the tensioner having a damping function is not limited to the hydraulic tensioner, and any other types of tensioners may be employed appropriately.

The engine accessory drive system disclosed herein is not limited to the above-described configurations for driving the oil pump 30 and for driving the balance shafts 36, 310. The engine accessory drive system disclosed herein may be employed as a configuration for driving other accessories. As described above, the engine accessory drive system disclosed herein is particularly useful in preventing instantaneous tension release on a tight side caused by angular velocity changes of a drive shaft. The engine accessory drive system disclosed herein is therefore applicable to a configuration for driving a fuel pump, for example.

DESCRIPTION OF REFERENCE CHARACTERS

1 Engine
21 Crankshaft (Drive Shaft)
30 Oil Pump
31 Oil Pump Drive Shaft (Driven Shaft)
33 Drive Chain (Endless Transmission Member)
36 First Balance Shaft
310 Second Balance Shaft
41 First Hydraulic Tensioner (First Tensioner)
43 Second Hydraulic Tensioner (Second Tensioner)
5 Hydraulic Tensioner
512 Plunger
513 Compression Coil Spring
515 Pressure Chamber

The invention claimed is:

1. An engine accessory drive system comprising:
a drive shaft;
a driven shaft coupled to an engine accessory;
an endless transmission member looped around the drive shaft and the driven shaft;
a first tensioner disposed on a slack side of the endless transmission member and configured to push and bias the endless transmission member to apply tension to the endless transmission member; and
a second tensioner disposed on a tight side of the endless transmission member and configured to push and bias the endless transmission member to apply tension to the endless transmission member, wherein
the second tensioner has a damping function to damp pushing force applied to the second tensioner by the endless transmission member in a direction opposite to a biasing direction,
the first tensioner has a damping function to damp pushing force applied to the first tensioner by the endless transmission member in a direction opposite to a biasing direction,
each of the first tensioner and the second tensioner is a hydraulic tensioner having a plunger configured to bias the endless transmission member in the biasing direction by utilizing a hydraulic fluid supplied to a pressure chamber, and a spring which biases the plunger in the biasing direction, and the hydraulic tensioner being configured to damp the pushing force by utilizing the hydraulic fluid leaked from the pressure chamber when the plunger is pushed by the endless transmission member in the direction opposite to the biasing direction,
biasing force of the first tensioner is set to be smaller than biasing force of the second tensioner, and
a spring constant of the spring included in the second tensioner is set to be greater than a spring constant of the spring included in the first tensioner.

2. The engine accessory drive system of claim 1, wherein each of the first tensioner and the second tensioner is configured such that a leakage amount of the hydraulic fluid is variable.

3. The engine accessory drive system of claim 1, wherein the slack side and the tight side of the endless transmission member may be arranged adjacent to each other in a direction orthogonal to a direction of a line connecting the drive shaft and the driven shaft in a space between the drive shaft and the driven shaft, and positions where the first tensioner and the second tensioner are opposed to each other and push the slack side and the tight side of the endless transmission member inward are located closer to the drive shaft or the driven shaft than a middle portion of the line connecting the drive shaft and the driven shaft.

4. The engine accessory drive system of claim 1, wherein each of the first tensioner and the second tensioner is configured such that a leakage amount of the hydraulic fluid is variable.

\* \* \* \* \*